Figure 1:
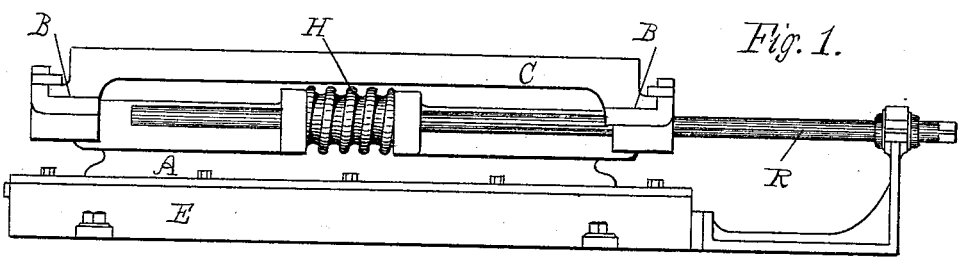

(No Model.)
2 Sheets—Sheet 1.

J. P. T. SLADE.
CHANGEABLE WORK SUPPORTING TABLE.

No. 351,214. Patented Oct. 19, 1886.

on line X.X.

Witnesses.
H. E. Lodge
A. F. Hayden.

Inventor.
James P. T. Slade.
F. Curtis, Atty.

N. PETERS, Photo-Lithographer, Washington, D. C.

(No Model.) 2 Sheets—Sheet 2.
J. P. T. SLADE.
CHANGEABLE WORK SUPPORTING TABLE.
No. 351,214. Patented Oct. 19, 1886.
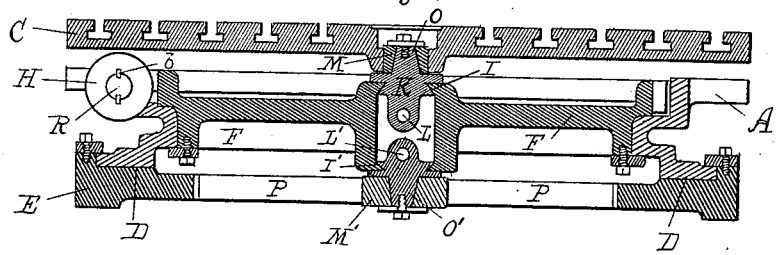
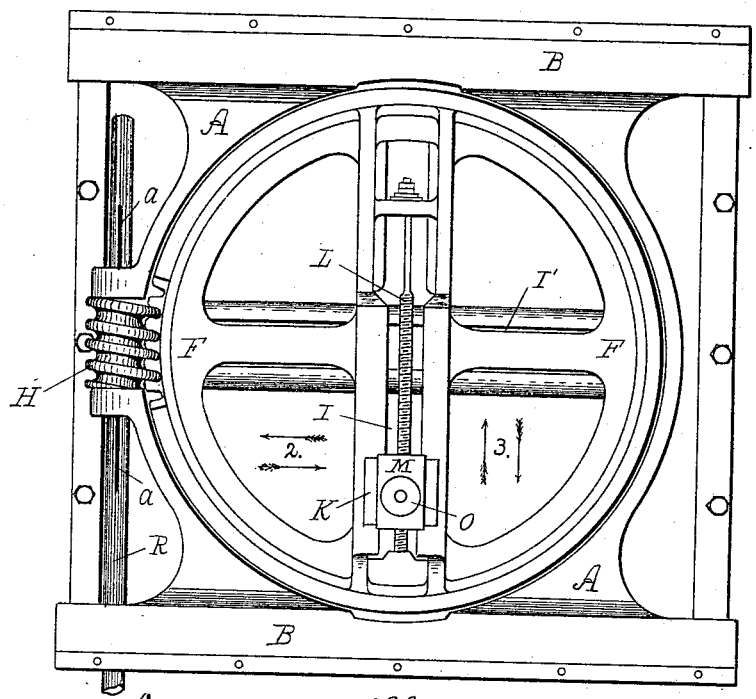
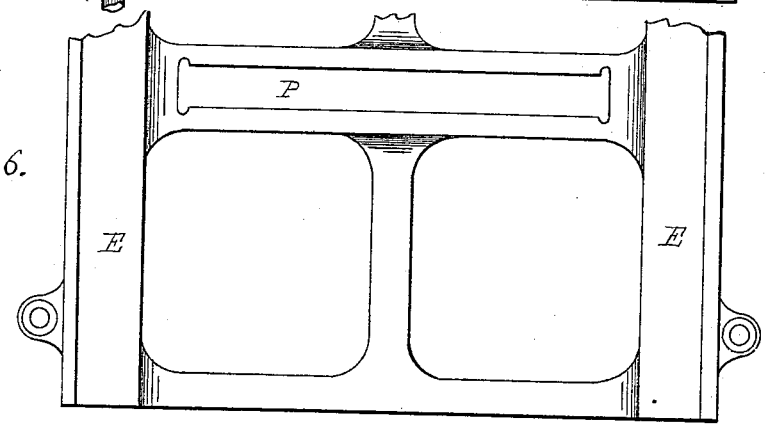
Witnesses.
H. E. Lodge
A. F. Hayden.
Inventor.
James P. T. Slade.
F. Curtis, atty.

UNITED STATES PATENT OFFICE.

JAMES P. T. SLADE, OF MANCHESTER, COUNTY OF LANCASTER, ENGLAND.

CHANGEABLE WORK-SUPPORTING TABLE.

SPECIFICATION forming part of Letters Patent No. 351,214, dated October 19, 1886.

Application filed September 2, 1886. Serial No. 212,475. (No model.) Patented in England November 10, 1884, No. 14,788.

*To all whom it may concern:*

Be it known that I, JAMES PARNELL TRUST SLADE, a subject of the Queen of Great Britain, residing at Manchester, in the county of Lancaster, England, have invented certain new and useful Improvements in a Mechanical Table for Forming Oval or Circular Figures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus by means of which circular or oval figures may be automatically produced; and it consists in the present instance of a table so actuated that any point upon its surface will be caused to travel and describe a similar path of movement with every other, either circular or oval, and with any proportion between the major and minor axis of such oval, or with these axes in either direction, as may be desired. Thus it will be seen that one novel feature in this table consists in being enabled to secure the work to be operated upon at any point on said table. This is due to the fact that there is no center of rotation. Then by actively inducing said table the latter will present the several portions of the object to be punched, drilled, milled, slotted, or otherwise shaped successively under the action of the cutting-tool in such a manner as to produce an oval or circular figure without rotation of the work or tool, as hitherto practiced.

Furthermore, by the construction and arrangement of my invention the formation of an oval or circular figure without the rotation of either the work, as in the oval chuck, or of the tools, as in oval-boring machines, in which the tool describes an oval, is easily accomplished, and said table applied to milling, slotting, punching, or other machines will enable them automatically to execute work of an oval or circular figure and on an object too large to be revolved.

My improved apparatus, briefly described, consists in a fixed bed-plate and two parts reciprocating at right angles—one carried by the other, the one so carried being termed a "crown-slide," upon which the work is to be placed. The other—an intermediary frame-piece—also supports the operating mechanism. The latter consists of a continuously-rotary worm-wheel or spur-gear provided with two diametrical slots, which are located upon the top and bottom faces thereof. Furthermore, adjustably mounted and oppositely disposed on said wheel are two slide-blocks, which reciprocate in grooves cut, respectively, in the crown-plate and the bed-plate, but at right angles one to the other. They also engage the slots in the worm-wheel; hence by the rotation of the actuating-wheel the conjoint effect of the slide-blocks within their respective slots is to cause the crown-slide or any point thereon to travel in curved paths of movement, since the latter is the resultant of reciprocating double right-line motion.

Figure 2:
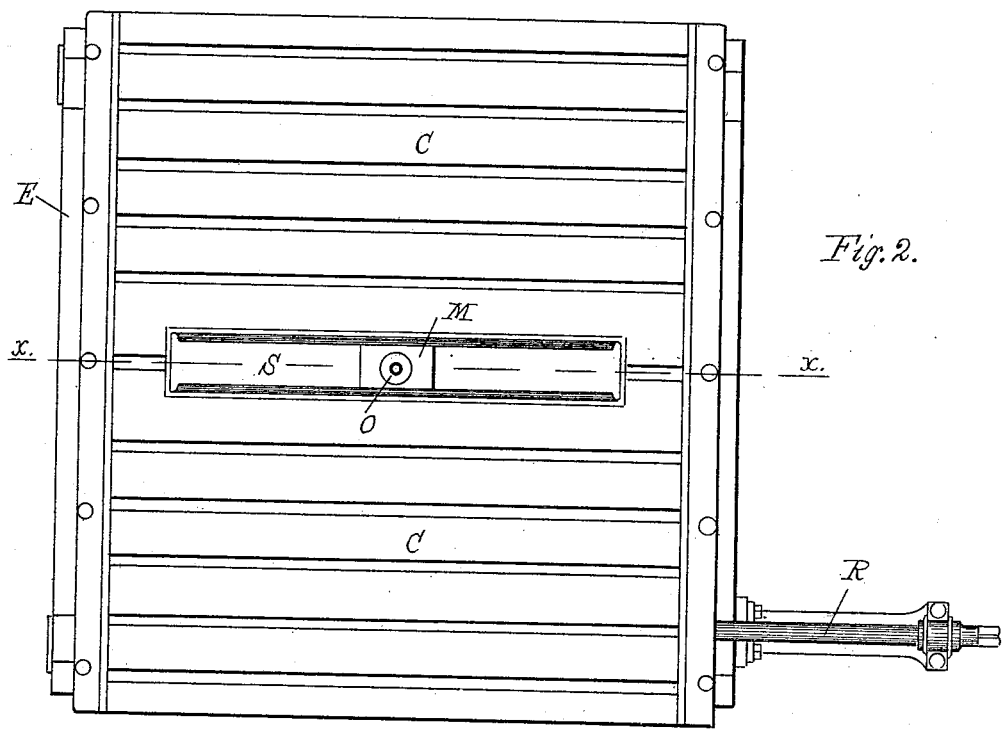
Figure 3:
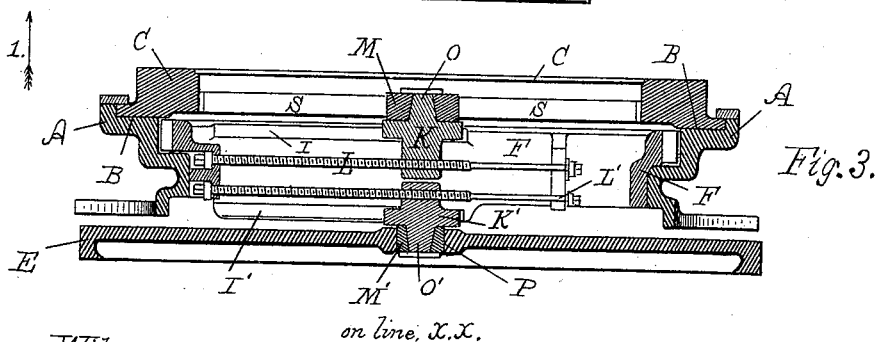

The drawings accompanying this specification represent, in Figure 1, an end elevation, and Fig. 2, a plan of a table and apparatus embodying my invention. Fig. 3 is a sectional elevation on line *x x* of Fig. 2; Fig. 4, a similar elevation at right angles to worm-shaft. Fig. 5 is a plan with crown-slide removed, while Fig. 6 is a similar view of a part of the base-plate.

In said drawings, A represents a frame-work, upon the top side of which is a planed surface, B, which supports the reciprocating slide C, termed the "crown-slide," while upon the bottom side of said frame-work is another planed surface, D, which enables the piece A to traverse upon a bed-plate, E, at right angles to the line of motion of the crown-slide C. The actuating mechanism consists, primarily, in a worm or toothed wheel, F, which is supported on its rim and disposed within the frame work A. This wheel is located in such a position that its faces are parallel with the planed surfaces B and D of the frame-work. The latter is so constructed that the top and bottom faces of the worm-wheel F are open. Continuous rotation of this wheel is effected by means of the shaft R, actuated by some suitable prime motor, while upon this shaft is affixed a worm, H, which engages the wheel F, and is confined between two lugs, G G, cast upon or secured to the frame-work A.

Across the top and bottom faces of the worm-wheel F are two grooves, I I', one in the top face and one in the bottom. These grooves must extend from one edge directly across the center of the wheel F. Within these two diametrical grooves I I' two slides, K K', are inserted, which are adjustable endwise by means of two screw-threaded rods, L L'. Thus by actuating the latter said slides K K' can be rendered more or less eccentric individually with respect to the center of the worm-wheel F, or both may be made concentric therewith. Thus it will be evident that when the slides in the worm-wheel F are placed equidistant from the center of the same any point on the crown-slide C will describe a circle, the size of such circle being regulated by the distance of the slides from the center of the worm-wheel. When the slides K K' are placed at unequal distances from the center of the worm-wheel F, an oval figure is formed, the proportion of the major and minor axis of such oval depending upon the respective distances of the slides from the center of the worm-wheel.

To connect and properly transmit the motion of the actuating-wheel F to the crown-slide and the frame-work A, I employ the slides K K', which are oppositely disposed and provided with short circular studs O O', revolving in similar blocks, M M', which are actuated thereby. The lower block, M', fits within a groove, P, cut in the bed-plate E, upon which latter the frame-work A slides, as hereinbefore premised. The upper and corresponding block, M, which is attached to the slide K in the top face of the worm-wheel, works in a groove, S, in the crown-slide C. This groove is disposed at right angles to the direction in which the crown-slide travels.

Since the worm-wheel F is carried by the reciprocating frame-piece A, and actuated by the worm H, endwise movement of the latter on the shaft R must be permitted; hence I have longitudinally grooved the shaft at $a$ and inserted a feather-key, $b$, whereby rotation of the shaft compels similar movement of the worm, while the requisite endwise reciprocations of the latter are allowed.

The operation of the above-described mechanism as an entirety is as follows: When rotation is imparted to the shaft R and the worm H affixed thereon, the worm-wheel F is caused to revolve and imparts motion to the frame-work A and crown-slide C, which reciprocate at right angles one to the other, the reciprocating motion of the frame-work A being in the direction of arrows 3, (see Fig. 5,) and is produced by the pressure of the slide K' on the block M' against the groove P in the bed-plate, the travel in each complete reciprocation being just double the distance of the adjustable slide K' from the center of the actuating-wheel F. On the other hand, the reciprocations of the crown-slide C are effected in the direction of arrows 2, Fig. 5, by the pressure of the slide K on the block M against the groove S. Similarly to that of the frame-work A, the travel of the crown-slide C is limited and adjusted by the eccentricity of the slide K' from the center of the wheel F. Furthermore, since the crown-slide C, upon which the work is fixed, operates simultaneously with the frame-work A, upon which it is mounted, its path of travel is affected thereby, and thus partakes of both motions, while the resultant is either an oval or circular movement.

As there is no center of rotation the work can be fastened to any part of the upper surface of the table, thus rendering the setting of work much easier than in an ordinary table with circular motion.

I claim—

1. In combination with a fixed bed-plate and a continuously-rotary toothed wheel slotted diametrically upon its upper and lower faces which engage two oppositely-disposed slides, the movable frame-work and the crown-slide moving thereon, but having motion of its own, both reciprocated by said slides, substantially as and for purposes herein described.

2. The mechanism for forming oval and circular figures, substantially as described, consisting of a grooved bed-plate, a movable frame-piece, the crown-slide reciprocating thereon, and the rotary wheel provided with the adjustable slides which engage with grooves in the bed-plate and crown-slide, all co-operating as herein set forth.

3. The bed-plate E, reciprocating frame-piece A, within which revolves the rotary wheel F, slotted at I, and provided with the adjustable slide K, in combination with the crown-slide C, reciprocated by said frame-piece A, while actuated and controlled in its own paths of travel by the groove S and slide K, all substantially as herein stated.

4. The combination, with the crown-slide actuated by a rotary wheel and moving upon and with the frame-piece A, of the rotary wheel F, mounted thereon, grooved at I', and provided with the adjustable slide K', and the bed-plate E, grooved at P, whereby reciprocations of the frame-piece A are produced and its travel limited, substantially as described.

5. In general combination, the crown-slide and bed-plate grooved at right angles one to the other, the frame-piece A, carrying said crown-slide and reciprocating transversely thereof, the shaft R, worm H, and the diametrically-slotted rotary wheel F, provided with rods L L', and the slides K K', adjustable thereon, the blocks M M', and slots I I', which co-operate with said slides to limit the reciprocations endwise, substantially as herein set forth and stated.

In testimony whereof I affix my signature in presence of two witnesses.

JAMES P. T. SLADE.

Witnesses:
GEO. LAMBSCOTT,
ARCHD. MCARNSH.